United States Patent Office 3,720,136
Patented Mar. 13, 1973

3,720,136
VIBRATING TABLE
Jiro Uchida and Minoru Osugi, Komatsu, Japan, assignors to Kabushiki Kaisha Komatsu Seisakusho, Tokyo, Japan
Filed Sept. 23, 1970, Ser. No. 74,693
Int. Cl. F15b 21/02; F01b 15/00
U.S. Cl. 91—35
5 Claims

ABSTRACT OF THE DISCLOSURE

The present invention relates to a vibrating table comprising an eccentric rotatable shaft driven by a prime mover, a spool of a servo valve which is reciprocated by a mechanism for converting the rotation of said eccentric shaft into reciprocal action, means for alternately switching the rotation of said eccentric shaft and the reciprocating movement of the spool of the servo valve causing alternate switching of the outlet and inlet of a pressurized fluid to vibration actuator.

---

The present invention relates to the vibrating table for giving elastic vibration to a material to be processed and other materials.

Said vibrating table of the present invention is placed on a broaching machine, or toothed wheel cutting machine, and a material to be processed is attached thereto to carry out the so called vibrating cutting and ultrasonic cutting.

In the conventional vibrating device, a material to be processed is directly connected to the vibrating source such as a mechanical vibrating source, an electromagnetic vibrating source, or a magnetic vibrating source, and therefore the following drawbacks are brought about;

(a) The generated vibration is poor;
(b) It is difficult to always keep a predetermined amplitude, number of cycles and vibration wave-form at a high cycle during a predetermined time.
(c) The feedback mechanism for keeping the amplitude is complicated, and when a vibration of high cycle is desired to be generated, the feedback mechanism becomes inaccurate.

The object of the present invention is to eliminate the drawbacks of the conventional vibrating device, and to provide a strong vibrating table capable of accurately obtaining optical vibration, the frequency of vibration, and amplitude of vibration without requiring special feedback mechanism.

The present invention is a vibrating table comprising an eccentric shaft in which the amount of eccentricity is adjustable, connected to a prime mover, a mechanism for converting the rotation of said eccentric shaft into reciprocating movement to transmit the same to the spool of a servo valve, an actuator controlled and vibrated with said servo valve, and in accordance with the present invention, the pressure of a pressurized fluid is adjusted onto a desirable position to adjust to a desirable degree the vibration force generated in said vibrating table and it is possible to obtain the desired amplitude of the vibrating table by adjusting the eccentricity of the eccentric shaft.

The present invention has such an effect as to realize easy conversion and adjustment of the number of vibrations of the vibrating table.

The attached diagrams show an embodiment of the vibrating table of the present invention;

Figure 1:
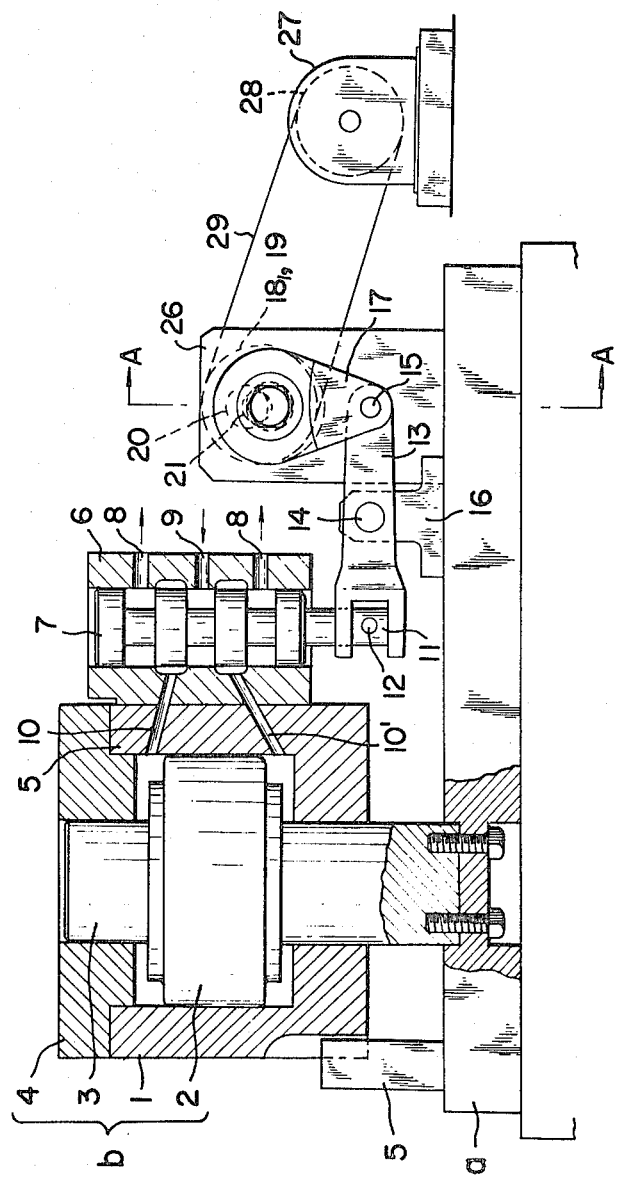
FIG. 1 is a partially cut side view of an embodiment of this invention.
Figure 2:
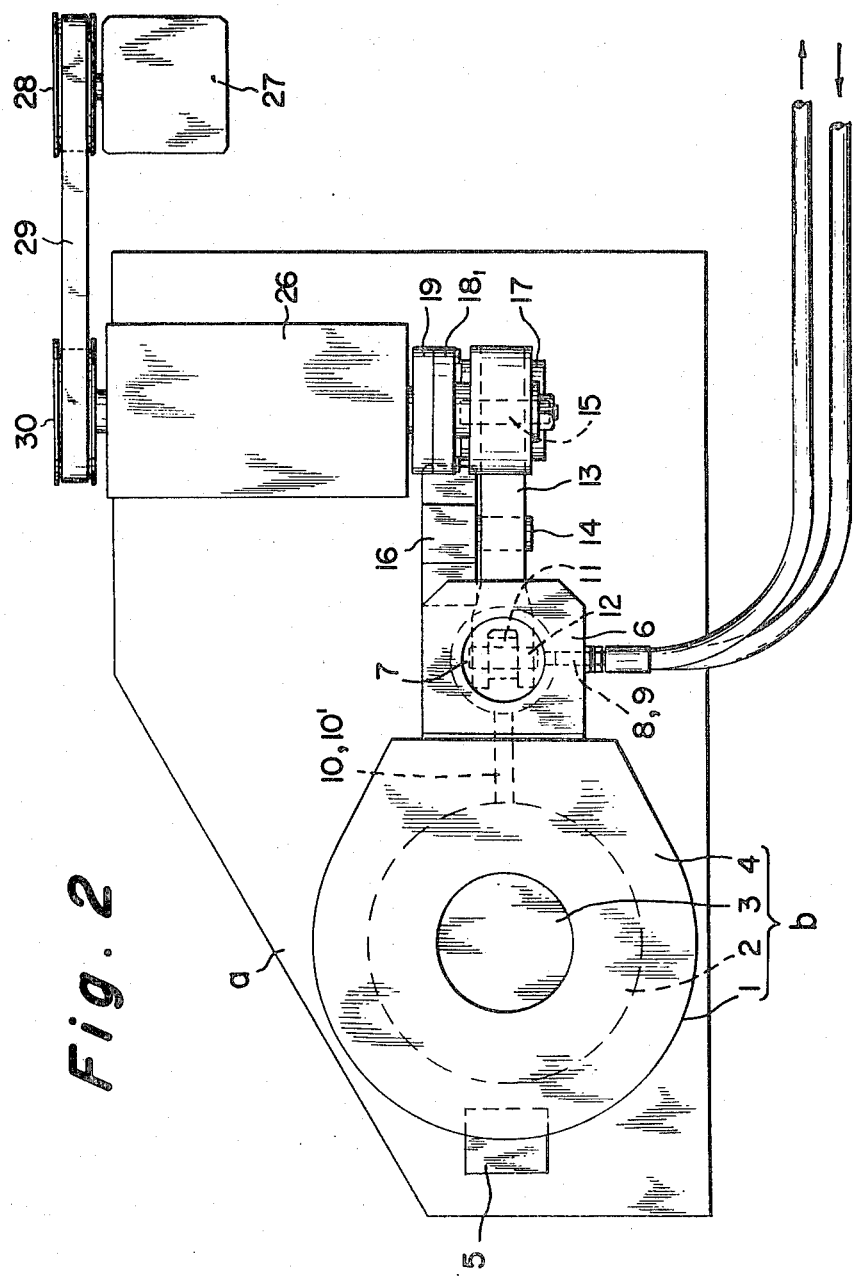
FIG. 2 is a plan view thereof.
Figure 3:
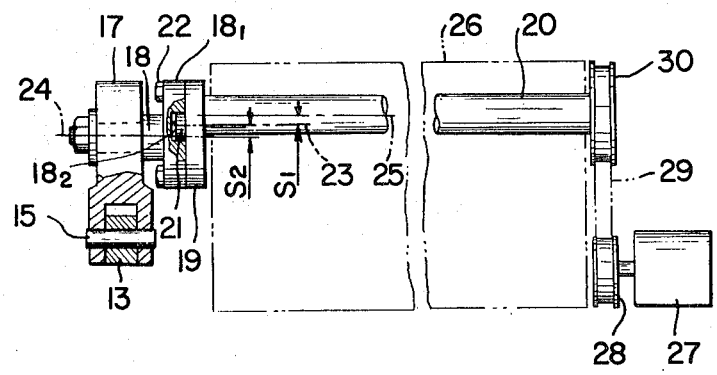
FIG. 3 is a cross-sectional view across line A—A of the embodiment shown in FIG. 1.
Figure 4:
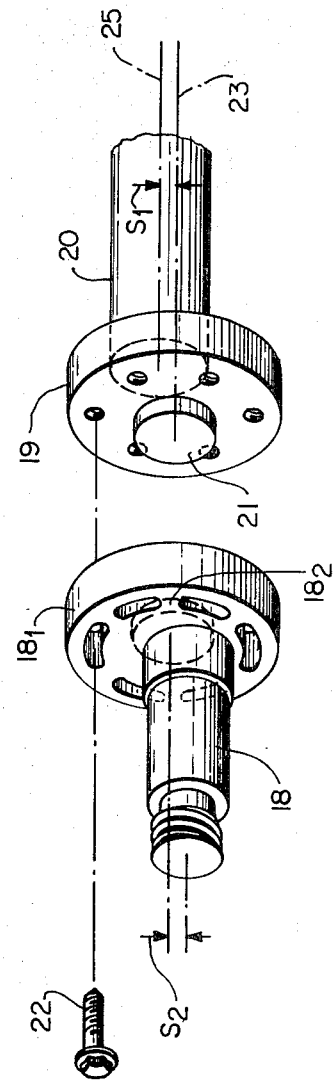
FIG. 4 is a perspective view of the shaft and flange arrangement for adjustable eccentricity.

The following are the explanations about an embodiment of the present invention in accordance with the attached diagrams.

The vibrating actuator $b$ is composed of a cylinder 1 and piston rod 3 of the piston 2 thereof, and said piston rod 3 is fixed on the base $a$.

Therefore, the cylinder 1 can move in the up and down direction on the outer periphery of the piston 2 along the piston 2 as a guide. A material to be processed is attached on lid 4 of the cylinder 1. Guide rail 5 is provided for preventing the rotation of the cylinder 1 in the peripheral direction with the piston rod 3 as the fulcrum, and guide rail 5 is fixed on the base $a$. A servo valve is provided in casing 6 which is fixed on the outside of the cylinder 1 by means of at least one bolt. Spool 7 moves up and down in the axial direction within casing 6 of the servo valve and sends fluid from a pressurized liquid source (not shown) through either of conduits 10 or 10' to operate said piston 2, or in the neutral state, cut off said fluid so that said fluid cannot be flowed into the path of 10 or 10'. Pressurized fluid is directed into the casing 6 of said servo valve through inlet 9, and is removed through outlets 8. Lever 13 is pivotally supported at approximately its center on bracket 16 on the base by means of a pin 14, and one end thereof is connected to spool 7 of the servo valve through the slide piece 11 and pin 12. The other end thereof is connected to the connecting rod 17 by means of pin 15. Therefore the rotation of the eccentric shaft 18 described hereinafter is converted into an up and down movement by means of the connecting rod 17, and said up and down movement, i.e., the mechanical vibration, is transmitted to said spool 7 by means of the lever 13. Pin 14 can be designed so that it can be adjusted to move (along with the bracket 16) to change the amount of amplitude of the spool 7, and this kind of contrivance should be taken into consideration in a more preferable planning of device. However, the change of amplitude of the spool can be done by the means described hereinafter, and therefore it should not be restricted thereto alone.

An electric motor 27 containing a prime mover such as variable speed gear, and a pair of timing pulleys 28, 30 are provided. Timing belt 29 connects said timing pulleys 28 and 30. A timing pulley 30 is fixed onto one end of a shaft 20, and a flange 19 is fixed onto the other end of the shaft 20. The shaft 20 is supported by a bearing casing 26 which has a structure designed to withstand high speed rotation. On the surface of the flange 19 fixed opposite to the other end of shaft 20, is provided a spigot 21 having an axis 23 eccentric from the axis 25 of the shaft 20 by a distance $S_1$. A flange $18_1$ is fixed to the rotary eccentric shaft 18, and a socket $18_2$ is provided at the flange $18_1$ for engaging the spigot 21 provided at the flange 19. The center of the socket $18_2$ is eccentric from the axis 24 of the eccentric shaft 18 by a distance $S_2$. And, the socket and spigot joint ararngement is constructed by inserting the spigot 21 into the socket $18_2$, and the eccentric amount from the shaft 20 to the eccentric shaft 18 may be varied from 0 to $(S_1+S_2)$ by rotation in a circumferential direction relative to the flange $18_1$ and the flange 19. The respective flanges $18_1$ and 19 are fixed at optional positions by means of the bolts 22.

The following are the explanations about the operation of the present invention.

The pressurized fluid does not work on the actuator $b$ when the servo valve is in the neutral state as mentioned before.

When the prime mover 27 is started, the eccentric shaft 18 is rotated by the timing pully 28, the timing belt 29, the timing pulley 30, and the shaft 20, and the rotation thereof is converted into up and down movement by means of the connecting rod 17. The up and down movement is transmitted to the spool 7 through the lever 13. When the spool 7 is moved upwards from the position shown in FIG. 1, the pressurized fluid arrives at the upper chamber of the piston 2 of the actuator through the path 10, and the cylinder 1 is forced upwards and the spool 7 and the casing 6 of the servo valve are raised and stopped as far as the neutral state. Thereafter, the fluid on the lower side of the piston removed by said piston and recovered into a drain tank through the path 10' and the outlet 8. On the other hand, when the spool 7 moves downwards from the position as is shown in the diagram of FIG. 1, the pressurized fluid flows in the opposite direction from the case when said spool is moved upwards, and the cylinder 1 moves downwards. Thus the cylinder 1 is vibrated up and down in accordance with the movement of the spool 7. The size of the vibration generated on the vibrating table can be adjusted by adjusting a pressure determining valve of the pressurized fluid source to a desirable point. In regard to the amplitude of vibration, it can be optionally obtained by adjusting the eccentric shaft and flange as mentioned before. The number of vibrations can be adjusted by adjusting the number of revolutions of the prime mover.

The structure of the device of the present invention has been explained so far in the foregoing paragraphs, and when the pressure of the pressurized fluid into a desirable point, the force of vibration generated on the table can be adjusted into a desirable size, and on the other hand, when the amount of eccentricity of the eccentric shaft is adjusted, it is possible to obtain a desirable amplitude of the vibrating table. In addition, when the number of revolutions of the prime mover is changed, it is possible to easily convert and adjust the number of vibrations of the vibrating table. The present invention has very useful effects from an industrial point of view as described.

What is claimed is:

1. A vibrating table comprising a prime mover on a base, a first shaft rotated at a predetermined position by said prime mover, a rotatable eccentric shaft so connected as to be adjustable in the eccentric amount from said first shaft, a connecting rod movably engaged with said eccentric shaft, a lever pivotally secured to the base at the intermediate portion thereof and pivotally secured to said connecting rod at its one end, a piston rod having a piston and fixed onto the base, a cylinder elevationally movable on the outer periphery of said piston as a guide, a lid mounted on the upper end of said cylinder for mounting a material to be processed, a servo valve fixed to said cylinder send for exhaust fluid from a pressurized liquid source alternatively into the upper or lower chamber of the piston of said cylinder, and a spool of said servo valve engaged with the other end of said lever.

2. A vibrating table as set forth in claim 1, wherein the outside cutout of said cylinder is engaged with a guide rail provided on the base whereby the rotation of said cylinder in the peripheral direction with said piston rod as a center is prevented.

3. A vibrating table as set forth in claim 1, further comprising a first flange provided on one end of said first shaft and having a spigot having an axis eccentric from the axis of said shaft on the flange surface opposite to said shaft, a second flange provided on one end of said rotatable eccentric shaft and having a socket engaged with said spigot having an axis eccentric from the axis of said eccentric shaft on the surface opposite to said eccentric shaft, and bolts for connecting said first and second flanges.

4. A vibrating table as set forth in claim 1, wherein said lever is pivotally supported at approximately its center on bracket on the base by means of a pin.

5. A vibrating table as set forth in claim 1, wherein a first pulley provided on the end of the shaft of said prime mover and a second pulley provided on the end of said first shaft are engaged with a timing belt.

References Cited

UNITED STATES PATENTS

| | | | |
|---|---|---|---|
| 760,062 | 5/1904 | Edwards | 91—216 B |
| 99,052 | 1/1870 | Bird | 74—600 |
| 2,751,752 | 6/1956 | Metcalf | 91—216 A |
| 632,010 | 8/1899 | Gamble | 91—196 |
| 96,643 | 11/1869 | Wanzer | 74—600 |
| 313,481 | 3/1885 | Dodd | 74—600 |
| 335,745 | 2/1886 | DeValin | 74—600 |
| 498,733 | 5/1893 | Vanderploeg | 74—600 |
| 3,589,239 | 6/1971 | Beauchet | 91—35 |
| 2,876,646 | 3/1959 | Nickson | 74—40 |
| 2,770,203 | 11/1956 | Ooms | 74—40 |

HENRY T. KUNKSIEK, Primary Examiner

U.S. Cl. X.R.

74—40, 600; 91—216